United States Patent [19]

Parish

[11] Patent Number: 4,984,522
[45] Date of Patent: Jan. 15, 1991

[54] RAILROAD CAR DIAPHRAGM ASSEMBLY

[75] Inventor: James M. Parish, Wadsworth, Ohio

[73] Assignee: SMR Technologies, Inc., Uniontown, Ohio

[21] Appl. No.: 409,776

[22] Filed: Sep. 20, 1989

[51] Int. Cl.$^5$ .................... B61D 17/20; B61D 17/22
[52] U.S. Cl. ........................................ 105/15; 105/18
[58] Field of Search ..................... 105/8.1, 15, 18, 21, 105/351, 452

[56] References Cited

U.S. PATENT DOCUMENTS

| | | | |
|---|---|---|---|
| 2,216,547 | 10/1940 | Christianson | 105/8.1 |
| 2,468,590 | 4/1949 | Dean | 105/21 |
| 3,996,859 | 12/1976 | Heisler et al. | 105/15 |
| 4,222,605 | 9/1980 | Engelhard | 105/18 |
| 4,599,947 | 7/1986 | Keefer | 105/15 |

Primary Examiner—Robert P. Olszewski
Assistant Examiner—S. Joseph Morano
Attorney, Agent, or Firm—Renner, Kenner, Greive, Bobak, Taylor & Weber

[57] ABSTRACT

A diaphragm assembly (10) is provided around the doors (11) of adjacent railway cars (12) and together adjacent diaphragm assemblies (10) enclose the passageway between adjacent railway cars (12). Each diaphragm assembly (10) includes a mounting plate (15) having vertical sections (17, 18) at the side of door (11) and an arch portion (19) above door (11) mounted to a car (12). The mounting plate (15) is of a predetermined lateral width and carries side portions (22) of a flexible membrane (21). A bridge portion (23) of flexible membrane (21) extends between side portions (22) and is attached to a face plate (25) which has vertical sections (26, 27) at the side of door (11) and an arch portion (28) above door (11). The face plate (25) has a predetermined lateral width greater than the width of mounting plate (15). Face plates (25) of adjacent cars (12) are adjacent to each other and a seal assembly (40) may be provided between the arch portions (28) thereof to prevent liquid from entering the passageway. At the bottom of the diaphragm assembly (10), a sill membrane (70) is attached to a sill plate (29) which is mounted between the vertical sections (26, 27) of the face plate (25). The sill plate (29) is attached to push rods (51) of the car (12) by a connector assembly (50) including bushings (57, 60) which minimize the noise of the connection. A walk plate (80) is hingedly connected to the sill plate (29) and is positioned above the sill membrane (70) to provide for ease of passage from one car (12) to another.

48 Claims, 8 Drawing Sheets

RAILROAD CAR DIAPHRAGM ASSEMBLY

TECHNICAL FIELD

This invention relates to a diaphragm assembly for a railroad car or the like. More particularly, this invention relates to a flexible diaphragm assembly for enclosing the space between the adjoining ends of adjacent railroad cars so as to provide an enclosed passageway between the adjacent cars.

BACKGROUND ART

It is preferred, if not required for safety, that the space between adjacent passenger cars of a train or like vehicle be enclosed to permit the safe and convenient movement of passengers between the cars. Such an enclosure must not only protect the passengers from the weather and other environmental factors, but it also must be capable of absorbing the forces engendered by the moving train particularly, for example, when the train is navigating a curve at a relatively high speed.

The most successful device known to date which addresses these needs is a system such as shown in U.S. Pat. No. 4,599,947. There each adjacent railroad car is provided with reinforced molded rubber material which surrounds the door of the car in an arch-like fashion. On one end the rubber is attached to a plate mounted on the railway car and at the other end is attached to face plates. The face plates of adjacent cars carry wear plates which abut each other when the cars are coupled. Step plates are provided over which passengers may walk when passing through the diaphragm enclosure from one car to another.

However, although it is the best train diaphragm known at the present time, the device of U.S. Pat. No. 4,599,947 is not without its problems. In particular, when trains equipped with such diaphragms negotiate sharp turns, the face plate of the diaphragm often binds with the rubber and the mounting plate and can be latched or locked thereto which can damage the flexible diaphragm material and destroy the integrity of the passageway between cars. Such is particularly prevalent in railway cars of the type that have a short coupling expanse between cars.

Another problem unaddressed by the prior art is that the floor or sill of the passageway formed by the diaphragms is not completely enclosed. Thus, air, dirt and noise from underneath the diaphragm can enter the passageway from around the step plates. Attempts to seal the sill area have included placing a urethane coated sponge material in the open areas. However, such material is not only expensive, but it is also quite susceptible to permanent deformation or coating cracks with resulting sponge deterioration permitting the air to pass therethrough, or requiring frequent replacement.

In addition, in the prior art diaphragms, moisture can seep in between the wear plates of adjacent diaphragm assemblies and run into the passageway. Such is not only irritating to the passengers but also, because the water will pick up the black phenol resin from which the wear plates are normally constructed, the black drippings can stain the clothing of the passenger.

Thus, the prior art has not addressed several problems encountered in the safe and convenient passage between railroad cars—which problems are solved by the diaphragm assembly according to the present invention.

DISCLOSURE OF THE INVENTION

It is thus a primary object of the present invention to provide a railroad car diaphragm assembly which totally protects the passenger moving from car to car from the environment.

It is another object of the present invention to provide a railroad car diaphragm assembly, as above, which will withstand the potential adverse effects of the train navigating sharp turns without damage to the diaphragm assembly or without interruption of the environmental free protection to the passengers.

It is a further object of the present invention to provide a railroad car diaphragm assembly, as above, which includes a closed off sill area to maintain the passageway between cars free of dirt or blasts of air emanating from below the train.

It is yet another object of the present invention to provide a railroad car diaphragm assembly, as above, which is coupled to the car in a manner to prevent undue irritating noise to the passengers passing from car to car.

It is an additional object of the present invention to provide a railroad car diaphragm assembly, as above, which will maintain the passageway between cars free of moisture which might seep between the assemblies of adjacent cars.

These and other objects of the present invention, which will become apparent from the description to follow, are accomplished by the means hereinafter described and claimed.

In general, a diaphragm assembly is provided around the door of each railway car and together two diaphragm assemblies on adjacent cars enclose the longitudinal space between the doors of the adjacent cars to provide for the safe and convenient passage therethrough. Each diaphragm assembly includes a mounting plate mounted in an arch-like fashion around the door and thus the mounting plate includes two generally vertical portions along each side of the door and an arch portion spanning the vertical portions across the top of the door. The mounting plate is of a predetermined lateral width and carries side portions of a flexible membrane. A bridge portion of the membrane extends between its side portions and is attached to a face plate which, like the mounting plate, is arch-like in configuration having two vertical side portions and an arch portion spanning the vertical portions. The face plate has a predetermined lateral width greater than the width of the mounting plate so that as the railway cars negotiate a turn and the flexible membrane distorts, the mounting plate does not engage or bind with the membrane and face plate.

Face plates of diaphragm assemblies on adjacent cars are adjacent to each other and a seal may be provided to extend across from the arch portion of one face plate to the arch portion of the other face plate to prevent water from entering the space between the plates of adjacent diaphragm assemblies.

At the bottom of the space between adjacent cars, each diaphragm assembly is provided with a sill plate positioned between the vertical portions of the face plate. The sill plate extends from the bottom of one vertical side portion thereof to the other and is attached to the railway car via a connector assembly which includes a shock absorbing bushing to eliminate any noise generated by the connection. A sill membrane is attached to the sill plate between the mounting plate and the face plate and extends from the bottom of one vertical side portion thereof to the other. A walk plate is provided above the sill membrane for ease of passage from one car to the other.

PREFERRED EMBODIMENT FOR CARRYING OUT THE INVENTION

Figure 1:
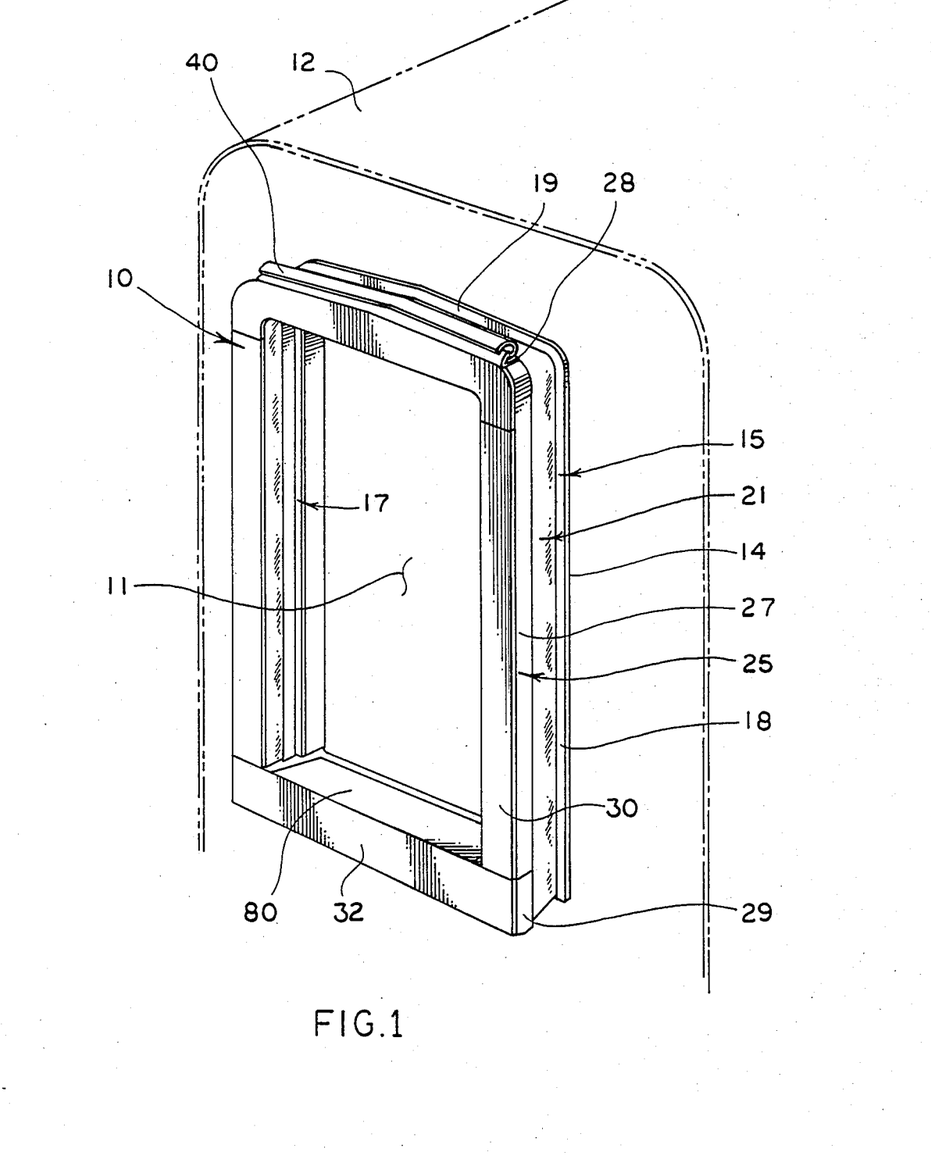
FIG. 1 is a somewhat schematic, partial perspective view of the end of a railway car having a diaphragm assembly according to the present invention.
Figure 2:
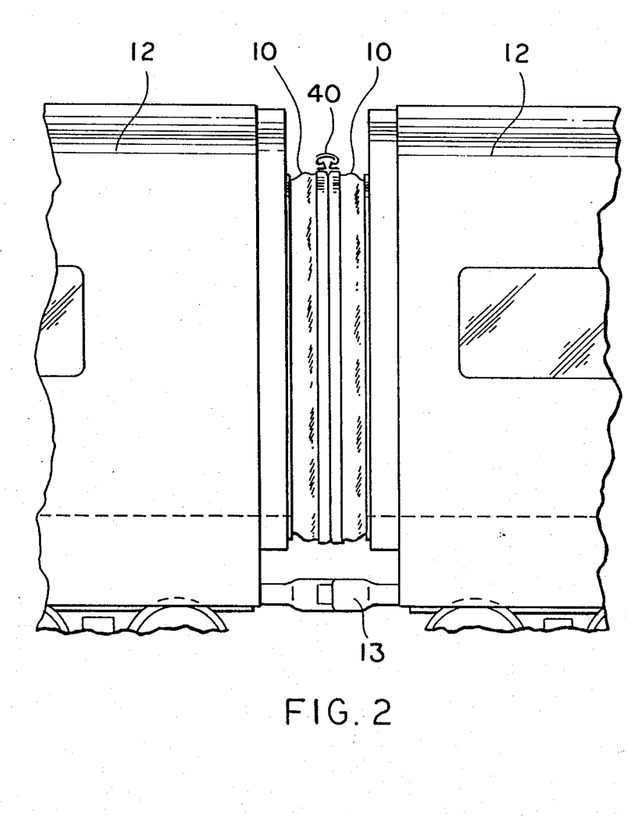
FIG. 2 is a somewhat schematic side elevational view of adjacent railway cars coupled together with the diaphragm assemblies of each forming an enclosure for the space between the cars.
Figure 3:
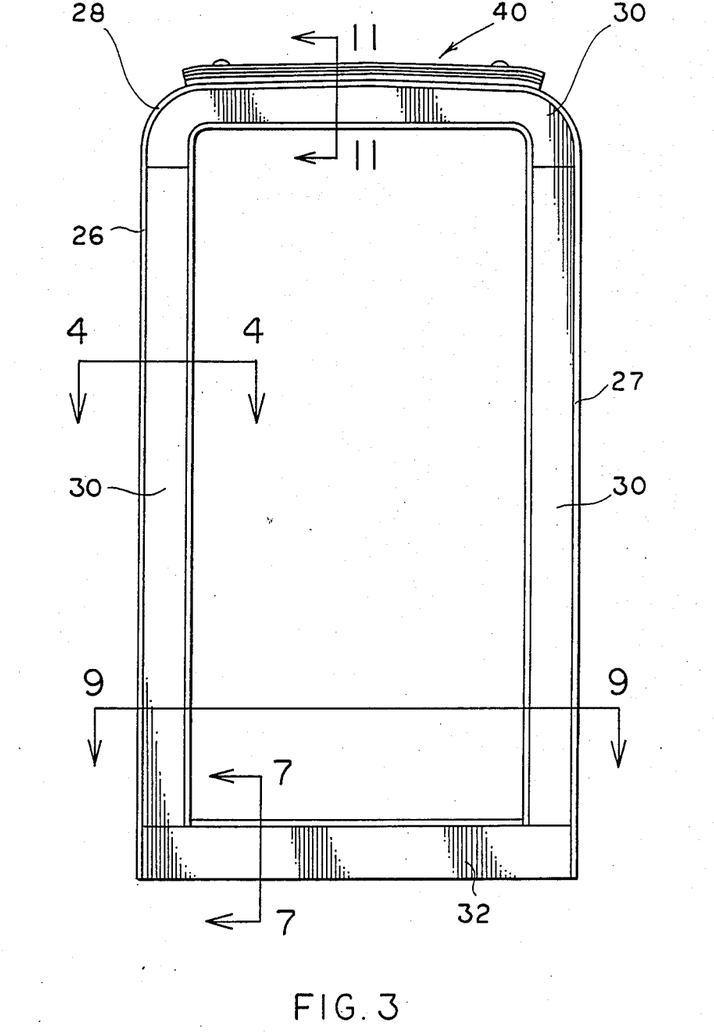
FIG. 3 is an elevational view of the diaphragm assembly.

A diaphragm assembly according to the concepts of the present invention is indicated generally by the numeral 10 in the drawings. As will hereinafter be described, a diaphragm assembly 10 is adapted to surround the passageway or door 11 of a railroad or other type of car 12, as shown in FIG. 1, and as shown in FIG. 2, diaphragm assemblies 10 mounted on adjacent cars 12 form a longitudinal passageway between cars 12, the cars being conventionally coupled as at 13.

Figure 4:
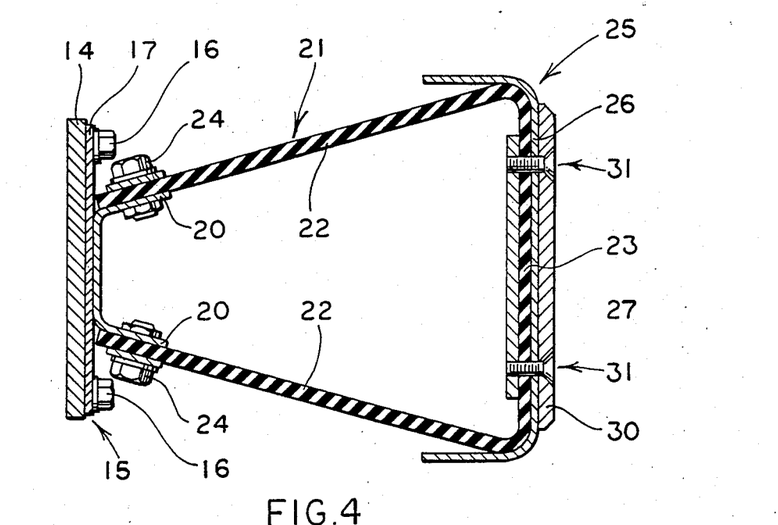
FIG. 4 is a sectional view taken substantially along line 4—4 of FIG. 3 and showing the flexible membrane of the diaphragm assembly in a relaxed, unloaded condition.

Each car 12 is provided with an arch-like adapter plate 14 attached to the end of the car around door 11. Each diaphragm assembly 10 includes a mounting plate generally indicated by the numeral 15 which is attached to the adapter plate 14 in a conventional manner as by bolts 16 (FIG. 4). Reference is made to U.S. Pat. No. 4,599,947 for details of such mounting and for other conventional details of diaphragm assemblies as may be necessary to understand the novel aspects of diaphragm assembly 10 according to the present invention.

Mounting plate 15 includes vertical sections 17 and 18 extending along the side of door 11 and an arch portion 19 extending between vertical sections 17 and 18 and above door 11. Arch portion 19 can be welded or otherwise affixed to vertical sections 17 and 18 to form a continuous mounting plate 15. For reasons to be hereinafter described, the width of mounting plate 15 is predetermined relative to the dimensions of other parts yet to be described. A typical width for mounting plate 15 would be approximately four inches.

As shown in FIG. 4, positioned generally centrally of the width of mounting plate 15, along all three sections 17, 18 and 19, is a generally U-shaped membrane mounting bracket 20. Bracket 20 may be affixed to plate 15 in any conventional fashion, such as welding, and it carries the ends of a flexible membrane, indicated generally by the numeral 21, and constructed, for example, of a reinforced neoprene material preferably about ¼ inch thick. A flexible membrane 21 is thus provided along vertical sections 17 and 18 and arch portion 19 of mounting plate 15 and includes side sections 22 and a bridging portion 23 extending between side sections 22. Flexible membrane 21 thus takes on the general configuration similar to the section of a truncated cone. The ends of side sections 22 are attached, as by bolts 24, to bracket 20 at spaced locations along the length of bracket 20.

A generally U-shaped face plate assembly is indicated generally by the numeral 25 and like mounting plate 15, it includes vertical sections 26 and 27 extending along the side of door 11 and generally parallel to vertical sections 17 and 18 of mounting plate 15. An arch portion 28 extends between vertical sections 26 and 27 above door 11 paralleling arch portion 19 of mounting plate 15. The width of face plate 25 is predetermined relative to the dimensions of mounting plate 15. As will be hereinafter described in more detail, face plate 25 should be wider than mounting plate 15. For example, with a mounting plate of approximately five inches in width, a face plate 25 of about six and three-eights inches in width would be preferred.

A U-shaped sill plate 29 extends between and is connected to the lower ends of vertical sections 26 and 27 of face plate 25 thereby forming with face plate 25 a generally rectangular frame around door 11. Face plate 25 is positioned around the outside of bridging portion 23 of flexible diaphragm 21 and a wear plate 30 is positioned on the outer face of face plate 25. Wear plate 30, bridging portion 23 of flexible diaphragm 21, and face plate 25 are held together by a plurality of spaced flat head screw assemblies indicated generally by the numeral 31. A similar wear plate 32 is attached to the outer surface of sill plate 29.

Wear plates 30 and 32 can be constructed of any suitable smooth plastic material, such as a reinforced phenol resin, such that it will readily slide against the wear plates of an identical diaphragm assembly 10 positioned on the adjacent railway car 12. Thus, with two diaphragm assemblies on adjacent railway cars 12, a passageway between the cars is formed with all contact between diaphragm assemblies being at the location of the wear plates.

When in the relaxed condition, that is, when the adjacent cars 12 are not coupled and there are no compression forces on diaphragm assembly 10, the flexible diaphragm 21, surrounding the door 11 at the vertical sides and across the top thereof, takes on the configuration, in cross section, as shown in FIG. 4. Thus, side sections 22 taper inwardly from the ends of bridging portion 23 toward mounting bracket 20. In this condition, and with the widths of mounting plate 15 and face plate 25 previously described, the distance between mounting plate 15 and face plate 25 is about eight inches. Thus, the angle at which the tapering side sections 22 meet mounting plate 15 is in the range of 10° to 20°. It should be apparent that by altering the distance between mounting plate 15 and face plate 25 and by changing the relative width dimensions of plates 15 and 25, the stiffness of membrane 21 can be varied or altered.

Figure 5:
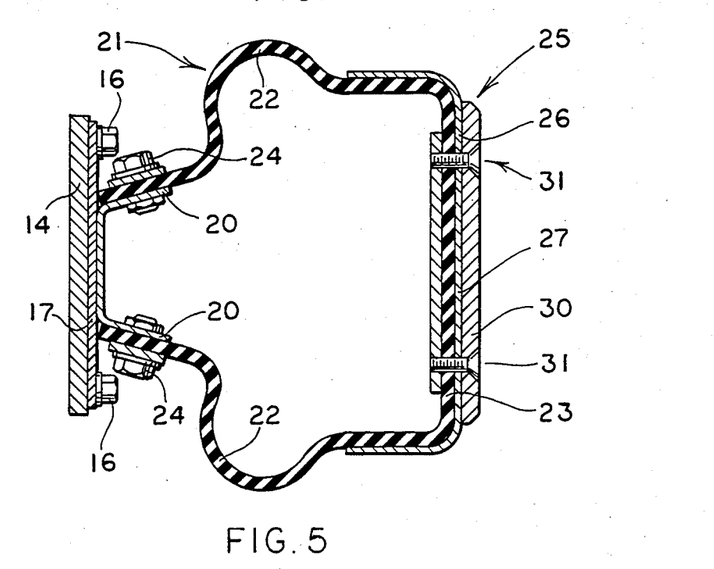
FIG. 5 is a view similar to FIG. 4 only showing the configuration of flexible membrane of the diaphragm assembly in its loaded or normal operating condition.

When adjacent cars 12 are coupled such that the wear plates of adjacent diaphragm assemblies 10 engage each other, flexible membrane 21 compresses to the general configuration shown in FIG. 5. If the original distance between mounting plate 15 and face plate 25 were the eight inches previously described, such compression reduces that dimension to approximately six and one-half inches. The flexible membrane further distorts from the configuration of FIG. 5 to absorb the sometimes significant shock provided by the moving cars without detriment to a passenger who may happen to be passing between cars.

Figure 6:
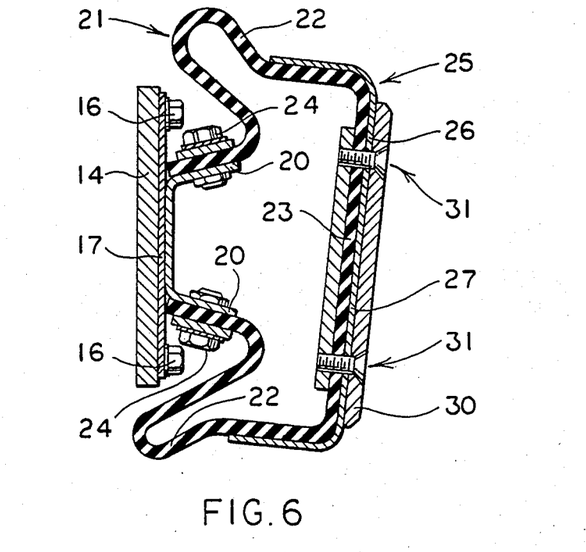
FIG. 6 is a view similar to FIGS. 4 and 5 only showing the configuration of the flexible membrane of the diaphragm assembly when the railway cars are negotiating a sharp turn.

When the cars 12 negotiate a sharp turn, flexible membranes 21 may distort to a configuration shown in FIG. 6. However, in view of the unique mounting of the membrane and the relative dimensions of plate 15 and plate 25, membrane 21 is not damaged, as by being pinched between plates 15 and 25. Moreover, face plate 25 cannot accidentally engage and become locked to mounting plate 15 because mounting plate 15 is of a lesser width than face plate 25 and is wholly confined within the width of plate 25 even in the most severely distorted position such as shown in FIG. 6.

Figures 10, 11:
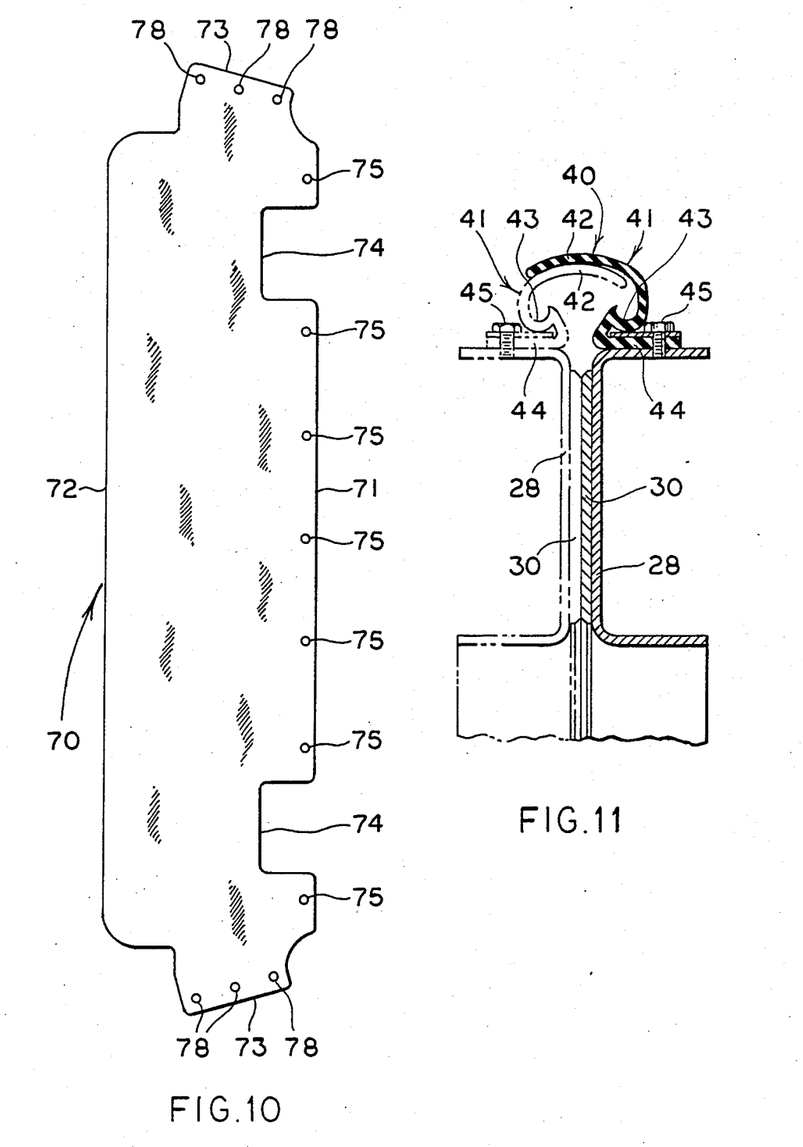
FIG. 10 is a flattened or laid out view of the sill membrane utilized in the diaphragm assembly.
FIG. 11 is a sectional view taken substantially along line 11—11 of FIG. 3 showing the diaphragm assembly of an adjacent car in phantom.

With the only connection between diaphragm assemblies 10 of adjacent cars 12 being the friction contact between adjacent wear plates 30 and adjacent wear plates 32, in order to prevent liquid, such as rain, from seeping between abutting wear plates and onto passengers therebelow, a seal assembly indicated generally by the numeral 40 can be provided. As best shown in FIG. 11, seal assembly 40 includes a sealing gasket, generally indicated by the numeral 41, for each diaphragm assembly 10. Gasket 41 can be of any polymer, such as neoprene, and includes an arcuate cover portion 42 terminating as a gutter portion 43 which turns back on itself as a mounting portion 44. Gasket 41 is attached to arch portion 28 of face plate assembly 25 as by bolts 45 extending through mounting portion 44. Gasket 41 is mounted so that cover portion 42 extends over the point of engagement of adjacent wear plates 30.

With the cover portion 42 of a gasket 41 of one diaphragm assembly 10 effectively tucked under the cover portion 42 of the adjacent diaphragm assembly 10, as shown in FIG. 11, seal assembly 40 is thereby formed. Liquid which might otherwise seep between wear plates 30 will normally harmlessly run off the seal assembly 40. If liquid should manage to seep between the lapped adjacent cover portions 42, it will be caught by gutter portion 43 underneath cover portions 42, and because of the slight arch of arch portion 28 of face plate assembly 25, it will run within gutter portion 43 and off to the sides of the diaphragm assembly. Thus, seal assembly 40 prevents liquid from entering into the space between adjacent cars.

The details of diaphragm assembly 10 in the area of sill plate 29 are best shown in FIGS. 7-10, inclusive, where, among other things, the manner in which sill plate 29 is connected to a car 12 is shown. A connector assembly, generally indicated by the numeral 50, is shown to be of the type utilized for cars 12 having spring loaded push rods 51, there usually being two such rods 51 and therefore two connector assemblies 50 for each car 12. Each push rod 51 has a vertical aperture 52 near the end thereof which receives a connector pin 53 of connector assembly 50.

Each connector assembly 50 also includes a lower bearing block 54 mounted on the lower branch of U-shaped sill plate 29 and an upper bearing block 55 mounted on the upper branch of U-shaped sill plate 29. Lower bearing block 54 has an aperture 56 therein into which a neoprene rubber shock absorbing bushing 57 is press fit. Within bushing 57 is a sleeve 58 which surrounds pin 53. Similarly, upper bearing block 55 has an aperture 59 therein into which a neoprene rubber shock absorbing bushing 60 is press fit. Within bushing 60 is a sleeve 61 which surrounds pin 53. A cap 62 is attached, as by cap screws 63 to the upper branch of sill plate 29. Cap 62 covers pin 53 and protects the same from being accidentally or inadvertently removed. An upper thrust bearing 64 is provided between bearing block 55 and each push rod 51 and a lower thrust bearing 65 is provided between bearing block 54 and each push rod 51 to minimize wear. As vibrations and other movements between push rod 51 and diaphragm assembly 10 occur, the force and noise accompanying the same are quietly absorbed by bushings 57 and 60 thus providing a more pleasant environment for passengers moving from car to car.

A sill membrane, generally indicated by the numeral 70, is provided to close off the bottom of each diaphragm assembly 10 to thereby totally enclose the passageway between cars 12. Sill membrane 70 can be made of a similar type of flexible material as flexible membrane 21 and is stretched between side sections 22 thereof between vertical sections 17 and 18 of mounting plate 15 near the bottom thereof and attached to sill plate 29.

The profile of sill diaphragm 70 when laid out flat is shown in FIG. 10. Sill diaphragm 70 has a front edge 71, a rear edge 72, and side flaps 73. Front edge 71 includes two notched areas 74 which allow sill diaphragm 70 to fit around the upper bearing blocks 55 of each connector assembly 50. A plurality of mounting apertures 75 are spaced along front edge 71 so that sill diaphragm 70 may be attached, as by cap screws 76 (FIG. 7), to a like plurality of spaced brackets 77 mounted on sill plate 29. Side flaps 73 of sill diaphragm 70 fold upwardly and are attached to side sections 22 of the flexible membranes 21 at the lower end of vertical sections 17 and 18 of mounting plate 15. For this purpose, side flaps 73 are provided with apertures 78 for attachment, as by cap screws 79 (FIGS. 7 and 8), to side sections 22. Once so mounted, sill diaphragm 70 totally seals the lower end of diaphragm assembly 10 from all of the open area therebelow.

Figure 7:
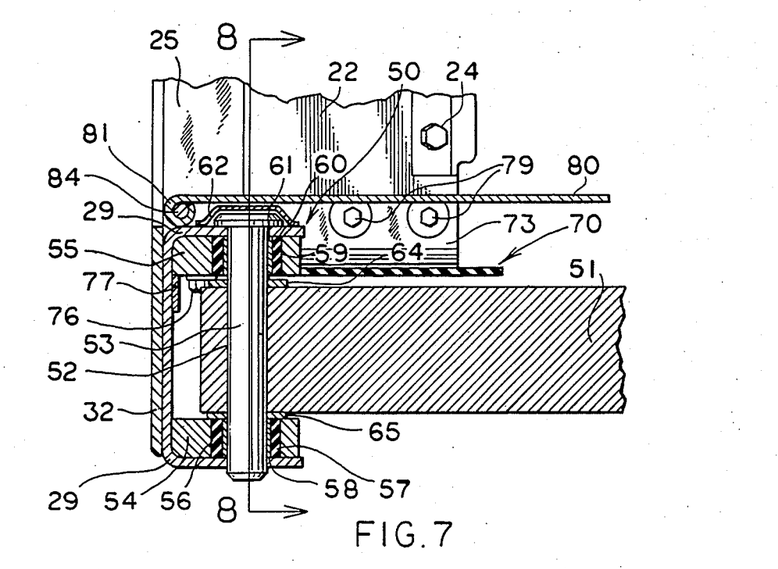
FIG. 7 is a fragmented sectional view taken substantially along line 7—7 of FIG. 3.
Figure 8:
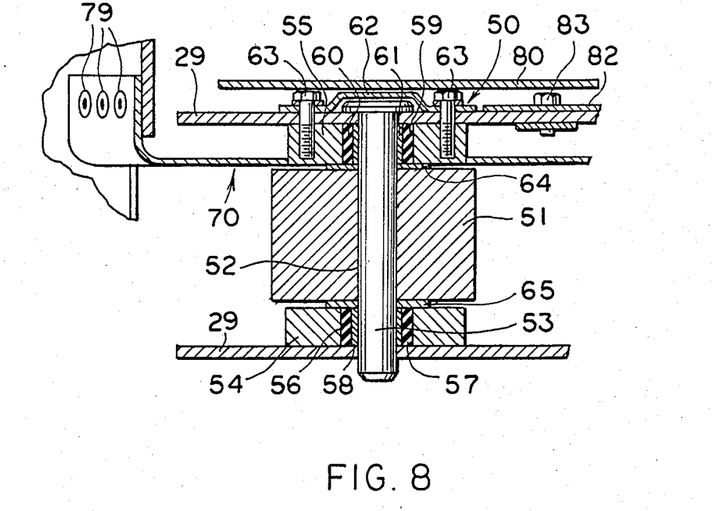
FIG. 8 is a fragmented sectional view taken substantially along line 8—8 of FIG. 7.
Figure 9:
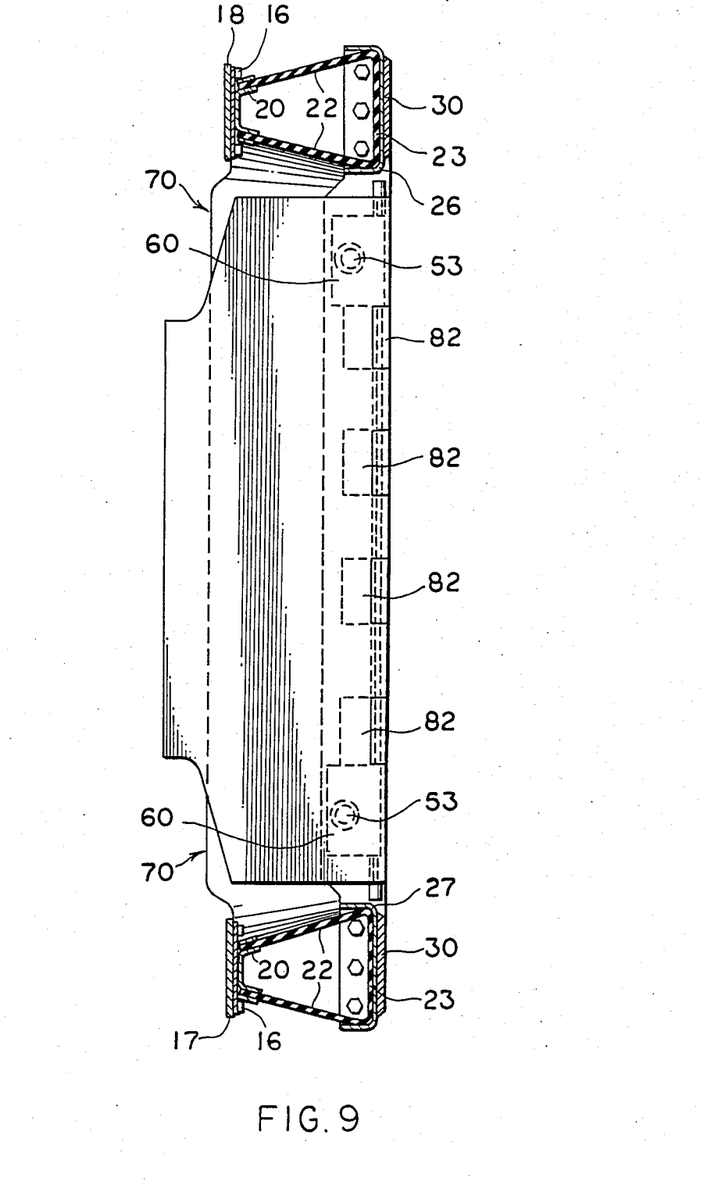
FIG. 9 is a sectional view taken substantially along line 9—9 of FIG. 3.

Being a flexible member, sill diaphragm 70 is not suitable for supporting the weight of passengers passing through diaphragm assembly 10. Thus, a walk plate 80 is provided for that purpose. As shown in FIG. 7, walk plate 80 is hinge mounted so that it can be swung upwardly and out of the way for installation and maintenance of the components therebelow. To that end, the inner end of walk plate 80 is provided with a series if hinge eyelet knuckles 81. A plurality of hinge brackets 82 (FIGS. 8 and 9) are mounted on sill plate 29, as by cap screws 83, and include hinge eyelets (not shown). Eyelet knuckles 81 along with the eyelets on hinge brackets 82 carry a hinge pin 84 so that walk plate 80 can be pivoted on pin 84 in a conventional hinge-like fashion.

It should thus be appreciated that a diaphragm assembly constructed as described herein totally encloses the passageway between adjacent railroad cars and permits an environmentally free, safe and convenient passageway between adjacent railroad cars, or the like, thereby improving the art and otherwise accomplishing the objects of the present invention.

I claim:

1. Apparatus for enclosing the longitudinal space between the doors of adjacent vehicular cars, each of the cars being provided with a diaphragm assembly, each diaphragm assembly comprising mounting plate means mounted on the car along the sides of the door and over the door in an arch-like fashion, said mounting plate means being of a predetermined width, flexible membrane means having two side portions and a bridging portion extending generally laterally therebetween, face plate means having a predetermined width greater than the predetermined width of said mounting plate means, and means to attach said side portions of said flexible membrane means to said mounting plate means and to attach said bridging portion of said flexible membrane means to said face plate means so that said flexible membrane means takes on the configuration in section of a truncated cone so that as the cars negotiate a turn and said flexible membrane means distorts, said mounting plate means does not engage or bind with said flexible membrane and said face plate means.

2. Apparatus for enclosing the longitudinal space between the doors of adjacent vehicular cars, each of the cars being provided with a diaphragm assembly, each diaphragm assembly comprising mounting plate means mounted on the car along the sides of the door and over the door in an arch-like fashion, said mounting plate means being of a predetermined width, flexible membrane means having two side portions and a bridging portion extending generally laterally therebetween, said side portions being attached to said mounting plate means, face plate means attached to said bridging portion of said flexible membrane means and having a predetermined width greater than the predetermined width of said mounting plate means, and bracket means mounted generally centrally of the predetermined width of said mounting plate means and carrying said side portions of said flexible membrane means, said flexible membrane means thereby taking on the configuration in section of a truncated cone so that as the cars negotiate a turn and said flexible membrane means distorts, said mounting plate means does not engage or bind with said flexible membrane means and said face plate means.

3. Apparatus according to claim 1 wherein said mounting plate means includes two generally vertical sections along the side of the door and an arch portion between said vertical sections and spanning the top of the door.

4. Apparatus according to claim 3 wherein said face plate means includes two generally vertical sections generally parallel to said vertical sections of said mounting plate means and an arch portion generally parallel to said arch portion of said mounting plate means.

5. Apparatus according to claim 1 wherein the distance between said face plate means and said mounting plate means is approximately twice the width of said mounting plate means.

6. Apparatus according to claim 5 wherein the predetermined width of said face plate means is less than twice the predetermined width of said mounting plate means.

7. Apparatus according to claim 6 wherein the predetermined width of said mounting plate means is approximately five inches, the predetermined width of said face plate means is approximately six and three-eights inches and the distance between said face plate means and said mounting plate means is approximately eight inches.

8. Apparatus according to claim 1 further comprising wear plate means mounted to said face plate means, said face plate means being positioned between said bridging portion of said flexible membrane means and said wear plate means, said wear plate means of one diaphragm assembly frictionally engaging the wear plate means of the adjacent diaphragm assembly.

9. Apparatus according to claim 1 wherein said face plate means includes an arch portion above the door and further comprising a seal assembly attached to said arch portion of said face plate means.

10. Apparatus for enclosing the longitudinal space between the doors of adjacent vehicular cars, each of the cars being provided with a diaphragm assembly, each diaphragm assembly comprising mounting plate means mounted on the car along the sides of the door and over the door in an arch-like fashion, said mounting plate means being of a predetermined width, flexible membrane means having two side portions and a bridging portion extending generally laterally therebetween, said side portions being attached to said mounting plate means, face plate means attached to said bridging portion of said flexible membrane means and having a predetermined width greater than the predetermined width of said mounting plate means so that as the cars negotiate a turn and said flexible membrane means distorts, said mounting plate means does not engage or bind with said flexible membrane means and said face plate means, said face plate means including an arch portion above the door, and a seal assembly attached to said arch portion and including an arcuate cover portion above said face plate means and the face plate means of an adjacent diaphragm assembly.

11. Apparatus according to claim 10 wherein said seal assembly includes a gutter portion near the bottom of and underneath said arcuate cover portion.

12. Apparatus for enclosing the longitudinal space between the doors of adjacent vehicular cars, each of the cars being of the type that includes at least one push rod and being provided with a diaphragm assembly, each diaphragm assembly comprising mounting plate means mounted on the car along the sides of the door and over the door in an arch-like fashion, said mounting plate means being of a predetermined width, flexible membrane means having two side portions and a bridging portion extending generally laterally therebetween, said side portions being attached to said mounting plate means, face plate means attached to said bridging portion of said flexible membrane means and having a predetermined width greater than the predetermined width of said mounting plate means so that as the cars negotiate a turn and said flexible membrane means distorts, said mounting plate means does not engage or bind with said flexible membrane means and said face plate means, sill plate means connected to said face plate means and extending below the door, and a connector assembly attaching said sill plate means to the push rod.

13. Apparatus according to claim 12 wherein said connector assembly includes bearing blocks each having an aperture therein, bushing means within the apertures of said bearing blocks, and pin means received within said bushing means and attaching the push rod to said sill plate means.

14. Apparatus according to claim 1 wherein said mounting plate means includes two generally vertical sections along the side of the door and further comprising a flexible sill membrane having ends mounted between a side portion of said flexible membrane means on one said vertical section and a side portion of said flexible membrane means on the other said vertical section.

15. Apparatus for enclosing the longitudinal space between the doors of adjacent vehicular cars, each of the cars being provided with a diaphragm assembly, each diaphragm assembly comprising mounting plate means mounted on the car and having two generally vertical sections along the sides of the door and also mounted over the door in an arch-like fashion, said mounting plate means being of a predetermined width, flexible membrane means having two side portions and a bridging portion extending generally laterally therebetween, said side portions being attached to said mounting plate means, face plate means attached to said bridging portion of said flexible membrane means and having a predetermined width greater than the predetermined width of said mounting plate means so that as the cars negotiate a turn and said flexible membrane means distorts, said mounting plate means does not engage or bind with said flexible membrane means and said face plate means, a flexible sill membrane having ends mounted between a side portion of said flexible membrane means on one side vertical section of said mounting plate means and a side portion of said flexible membrane means on the other said vertical section of said mounting plate means, and sill plate means connected to said face plate means and extending below the door, said flexible sill membrane having an edge attached to said sill plate means.

16. Apparatus according to claim 15 further comprising walk plate means above said flexible sill membrane and hingedly connected to said sill plate means.

17. Apparatus for enclosing the longitudinal space between the doors of adjacent cars, each of the cars being provided with a diaphragm assembly, each diaphragm assembly comprising mounting plate means mounted on the car around the door, flexible membrane means having two side portions attached to said mounting plate means and a bridging portion extending therebetween, plate means having two generally vertical portions and an arch portion spanning above said vertical portions, said plate means being attached to said bridging portion of said flexible membrane means and facing the plate means of the diaphragm assembly of the adjacent car, and seal means carried by said arch portion of said plate means and extending above the arch portion of the plate means of the diaphragm assembly of the adjacent car to prevent liquid from entering the space between said plate means of the diaphragm assemblies of adjacent cars.

18. Apparatus according to claim 17 wherein said seal means includes a flexible gasket attached to said arch portion of said plate means.

19. Apparatus according to claim 18 wherein said flexible gasket includes an arcuate cover portion extending over the arch portion of the plate means of the diaphragm assembly of the adjacent car.

20. Apparatus according to claim 19 wherein said arcuate cover portion is lapped over the arcuate cover portion of the flexible gasket of the seal means of the diaphragm assembly of the adjacent railway car.

21. Apparatus according to claim 20 wherein said flexible gasket includes a gutter portion near the bottom of and underneath said arcuate cover portion to receive any liquid which might seep between said lapped-over cover portions.

22. Apparatus according to claim 17 wherein the width of said mounting plate means is less than the width of said plate means.

23. Apparatus according to claim 17 wherein said plate means includes a face plate and a wear plate, said face plate means being positioned between said bridging portion of said flexible membrane means and said wear plate, said wear plate of one diaphragm assembly frictionally engaging the wear plate of the adjacent diaphragm assembly.

24. Apparatus according to claim 17 wherein said mounting plate means includes two generally vertical sections along the side of the door and further comprising a flexible sill membrane having ends mounted between a side portion of said flexible membrane means on one said vertical section and a side portion of said flexible membrane means on the other said vertical section.

25. Apparatus according to claim 24 further comprising sill plate means connected to said plate means and extending below the door, said flexible sill membrane having an edge attached to said sill plate means.

26. Apparatus for enclosing the longitudinal space between the doors of adjacent vehicular cars, each of the cars being provided with a diaphragm assembly, each diaphragm assembly comprising mounting plate means mounted on the car and including a generally vertical portion on each side of the door, face plate means spaced from said mounting plate means and including a generally vertical portion on each side of the door, flexible membrane means extending from said vertical portions of said mounting plate means to said vertical portions of said face plate means, and sill membrane means extending between said mounting plate means and said face plate means from near the bottom of the vertical portions of said mounting plate means and said face plate means on one side of the door to the bottom of the vertical portions of said mounting plate means and said face plate means on the other side of the door, said sill membrane means being attached to said flexible membrane means near the bottom of the vertical portions of said mounting plate means and said face plate means on both sides of the door to enclose the bottom of the diaphragm assembly.

27. Apparatus for enclosing the longitudinal space between the doors of adjacent vehicular cars, each of the cars being provided with a diaphragm assembly, each diaphragm assembly comprising mounting plate means mounted on the car and including a generally vertical portion on each side of the door, face plate means spaced from said mounting plate means and including a generally vertical portion on each side of the door, flexible membrane means extending from said vertical portions of said mounting plate means to said vertical portions of said face plate means, sill plate means mounted between the vertical portions of said face plate means, and sill membrane means having a front edge attached to said sill plate means and extending between said mounting plate means and said face plate means from near the bottom of the vertical portions of said mounting plate means and said face plate means on one side of the door to the bottom of the vertical portions of said mounting plate means and said face plate means on the other side of the door to enclose the bottom of the diaphragm assembly.

28. Apparatus according to claim 27 wherein said sill membrane means includes side flaps connected to said flexible membrane means.

29. Apparatus according to claim 27, the car being of the type that includes at least one push rod and further comprising a connector assembly attaching said sill plate means to the push rod.

30. Apparatus according to claim 29 wherein said connector assembly includes bearing blocks attached to said sill plate means and each having an aperture therein, bushing means within the apertures of said bearing blocks, and pin means received within said bushing means and attaching the push rod to said sill plate means.

31. Apparatus according to claim 30 wherein said front edge of said sill membrane means includes notches to fit around said bearing blocks.

32. Apparatus for enclosing the longitudinal space between the doors of adjacent vehicular cars, each of the cars being provided with a diaphragm assembly, each diaphragm assembly comprising mounting plate means mounted on the car and including a generally vertical portion on each side of the door, face plate means spaced from said mounting plate means and including a generally vertical portion on each side of the door, sill plate means mounted between the vertical portions of said face plate means, flexible membrane means extending from said vertical portions of said mounting plate means to said vertical portions of said face plate means, sill membrane means extending between said mounting plate means and said face plate means from near the bottom of the vertical portions of said mounting plate means and said face plate means on one side of the door to the bottom of the vertical portions of said mounting plate means and said face plate means on the other side of the door to enclose the bottom of the diaphragm assembly, and walk plate means carried by said sill plate means and positioned above said sill membrane means.

33. Apparatus according to claim 32 wherein an end of said walk plate means includes hinge eyelet knuckles and further comprising hinge brackets carried by said sill plate means and a hinge pin connecting said hinge eyelet knuckles to said hinge brackets so that said walk plate means can swing about said pin.

34. Apparatus for enclosing the longitudinal space between the doors of adjacent vehicular cars, each of the cars being provided with a diaphragm assembly, each diaphragm assembly comprising mounting plate means mounted on the car and including a generally vertical portion on each side of the door, face plate means spaced from said mounting plate means and including a generally vertical portion on each side of the door and an arch portion extending above the door from the top of one generally vertical portion to the top of the other generally vertical portion, flexible membrane means extending from said vertical portions of said mounting plate means to said vertical portions of said face plate means, sill membrane means extending between said mounting plate means and said face plate means from near the bottom of the vertical portions of said mounting plate means and said face plate means on one side of the door to the bottom of the vertical portions of said mounting plate means and said face plate means on the other side of the door to enclose the bottom of the diaphragm assembly, and a seal assembly attached to said arch portion of said face plate means and extending above the face plate means of an adjacent diaphragm assembly.

35. Apparatus according to claim 26 wherein said face plate means includes an arch portion extending above the door from the top of one generally vertical portion to the top of the other generally vertical portion, said mounting plate means includes an arch portion extending above the door from the top of one generally vertical portion to the top of the other generally vertical portion, said flexible membrane means extending from said arch portion of said face plate means to said arch portion of said mounting plate means.

36. Apparatus according to claim 35 wherein said flexible membrane means includes two side portions attached to said mounting plate means and a bridging portion between said side portions and attached to said face plate means.

37. Apparatus according to claim 36 wherein said mounting plate means has a predetermined width less than a predetermined width of said face plate means.

38. Apparatus for enclosing the longitudinal space between the doors of adjacent vehicular cars, each of the cars having a push rod connector assembly and a diaphragm assembly, each said diaphragm assembly comprising mounting plate means mounted on the car and including a generally vertical portion on each side of the door, face plate means spaced from said mounting plate means and including a generally vertical portion on each side of the door, flexible membrane means extending from said vertical portions of said mounting plate means to said vertical portions of said face plate means, sill plate means mounted between the vertical portions of said face plate means near the bottom thereof, and means to connect said sill plate means to the push rod connector assembly of the car without creating undue noise between said sill plate means and the push rod connector assembly as the car moves.

39. Apparatus according to claim 38 further comprising sill membrane means extending between said mounting plate means and said face plate means from near the bottom of the vertical portions of said mounting plate means and said face plate means on one side of the door to the bottom of the vertical portions of said mounting plate means and said face plate means on the other side of the door to enclose the bottom of the diaphragm assembly.

40. Apparatus according to claim 39 further comprising walk plate means hingedly connected to said sill plate means and positioned above said means to connect and said sill membrane means.

41. Apparatus according to claim 38 wherein said means to connect includes bearing blocks attached to said sill plate means and each having an aperture therein, and pin means received within said aperture and attaching the push rod connector to said sill plate means.

42. Apparatus according to claim 41 wherein said means to connect further includes bushing means within said aperture between said pin means and said bearing blocks.

43. Apparatus according to claim 42 wherein said means to connect further includes bearing means within said aperture between said pin means and said bushing means.

44. Apparatus according to claim 43 further comprising sill membrane means having an edge attached to said sill plate means and having notches in said edge to surround said bearing blocks of said means to connect.

45. Apparatus according to claim 38 wherein said face plate means includes an arch portion extending above the door from the top of one generally vertical portion to the top of the other generally vertical portion, said mounting plate means includes an arch portion extending above the door from the top of one generally vertical portion to the top of the other generally vertical portion, said flexible membrane means extending from said arch portion of said face plate means to said arch portion of said mounting plate means.

46. Apparatus according to claim 45 wherein said flexible membrane means includes two side portions attached to said mounting plate means and a bridging portion between said side portions and attached to said face plate means.

47. Apparatus according to claim 46 wherein said mounting plate means has a predetermined width less than a predetermined width of said face plate means.

48. Apparatus for enclosing the longitudinal space between the doors of adjacent vehicular cars, each of the cars being provided with a diaphragm assembly, each diaphragm assembly comprising mounting plate means mounted on the car along the sides of the door and over the door in an arch-like fashion, flexible membrane means having two side portions and a bridging portion extending generally laterally therebetween, said side portions being attached to said mounting plate means, face plate means attached to said bridging portion of said flexible membrane means, and means to attach said side portions of said flexible membrane means to said mounting plate means and to attach said bridging portion of said flexible membrane means to said face plate means so that said flexible membrane means takes on the configuration in section of a truncated cone so that as the cars negotiate a turn and said flexible membrane means distorts, said mounting plate means does not engage or bind with said flexible membrane and said face plate means.

* * * * *

UNITED STATES PATENT AND TRADEMARK OFFICE
CERTIFICATE OF CORRECTION

PATENT NO. : 4,984,522
DATED : January 15, 1991
INVENTOR(S) : James M. Parish It is certified that error appears in the above-identified patent and that said Letters Patent is hereby corrected as shown below:

Column 6, line 58, "if" should read --of--.

Column 9, line 28, claim 15, line 21, "side" should read --said--.

Column 9, line 39, claim 17, line 2, following the word "adjacent" insert the word --vehicular--.

Column 9, line 66, claim 20, line 4, delete the word "railway".

Signed and Sealed this

Second Day of January, 1996

*Attest:*

BRUCE LEHMAN

*Attesting Officer*     *Commissioner of Patents and Trademarks*